United States Patent [19]

Araya et al.

[11] Patent Number: 4,610,718

[45] Date of Patent: Sep. 9, 1986

[54] METHOD FOR MANUFACTURING ULTRA-FINE PARTICLES

[75] Inventors: Takeshi Araya, Higashikurume; Ryoji Okada; Yoshiro Ibaraki, both of Ibaraki; Susumu Hioki, Kashiwa; Masatoshi Kanamaru, Ibaraki; Yoshishige Endo, Ibaraki; Mitsuaki Haneda, Ibaraki, all of Japan

[73] Assignee: Hitachi, Ltd., Tokyo, Japan

[21] Appl. No.: 726,651

[22] Filed: Apr. 24, 1985

[30] Foreign Application Priority Data

| | | | |
|---|---|---|---|
| Apr. 27, 1984 | [JP] | Japan | 59-83715 |
| Apr. 27, 1984 | [JP] | Japan | 59-83711 |
| Apr. 27, 1984 | [JP] | Japan | 59-83710 |

[51] Int. Cl.⁴ ................ B01J 2/04

[52] U.S. Cl. ................ 75/0.5 C; 264/10

[58] Field of Search ................ 264/10, 12, 82; 75/0.5 R, 0.5 B, 0.5 C

[56] References Cited

U.S. PATENT DOCUMENTS

| | | | |
|---|---|---|---|
| 3,975,184 | 8/1976 | Akers | 75/0.5 B |
| 4,376,740 | 3/1983 | Uda et al. | 264/10 |
| 4,482,134 | 11/1984 | Uda et al. | 266/217 |
| 4,490,601 | 12/1984 | Yokoyama | 219/69 R |

FOREIGN PATENT DOCUMENTS

| | | | |
|---|---|---|---|
| 3233402 | 1/1984 | Fed. Rep. of Germany | 75/0.5 B |

*Primary Examiner*—Christopher W. Brody

*Attorney, Agent, or Firm*—Antonelli, Terry & Wands

[57] ABSTRACT

In a method wherein arcs are struck across a material to vaporize into ultra-fine particles and an electrode, thereby to manufacture the ultra-fine particles; the material to turn into the ultra-fine particles is arranged for at least either of the electrodes, and plasma currents are generated from the material and the electrode, whereby the formation rate of the ultra-fine particles per unit input is increased, and the material is formed in the shape of a rod or a wire, and a feeder capable of continuously supplying the material is disposed, whereby the ultra-fine particles can be continuously manufactured.

6 Claims, 16 Drawing Figures

METHOD FOR MANUFACTURING ULTRA-FINE PARTICLES

BACKGROUND OF THE INVENTION

1. Field of the Invention

The present invention relates to a method of and an apparatus for manufacturing the ultra-fine particles of metals, ceramics etc.

2. Description of the Prior Art

As a method of manufacturing ultra-fine particles, what is called the hydrogen arc heating method has heretofore been known as disclosed in U.S. Pat. No. 4,482,134. When compared with other methods, this method is higher in the formation rate of the ultra-fine particles and may be smaller in the scale of a manufacturing apparatus, so that it can produce the ultra-fine particles economically. The hydrogen arc heating method, however, needs to perform heating and melting on a water-cooled crucible or water-cooled hearth and indispensably requires a large amount of cooling water in order to heat and melt the surface of a material over the largest possible area and perform hydrogen absorbing and emitting reactions owing to the energy of arcs. Therefore, the energy of the hydrogen arcs being a heating source is deprived of a greater part by the cooling water, resulting in a low thermal efficiency, and it has been difficult to economically produce the ultra-fine particles. Moreover, with the hydrogen arc heating method, the material in a small amount is heated and melted, so that a continuous operation has been difficult because when this material has entirely become the ultra-fine particles, the manufacturing apparatus must be shut down to supply the material anew.

OBJECTS OF THE INVENTION

An object of the present invention is to provide a manufacturing method which can economically produce ultra-fine particles, especially those of metals, ceramics etc. not greater than 0.1 μm, owing to a high formation rate per unit input.

Another object of the present invention is to provide a manufacturing apparatus which need not be shut down in supplying a material to be turned into ultra-fine particles, and which is accordingly capable of continuous production.

SUMMARY OF THE INVENTION

The present invention consists in a method of manufacturing ultra-fine particles wherein arcs are struck across electrodes and wherein a material to be vaporized into the ultra-fine particles is employed for at least one of the electrodes, characterized in that an arc current or/and an arc voltage is/are set at a predetermined value/predetermined values so as to generate plasma currents flowing from the end parts of the respective electrodes toward the intermediate parts of the arcs, whereby the formation rate of the ultra-fine particles per unit input can be enhanced.

The present invention consists also in an apparatus for manufacturing ultra-fine particles having a vessel in which a gas is enclosed, a pair of electrodes which are arranged within the vessel and which strike arcs, and a collecting compartment which collects the ultra-fine particles formed; characterized by comprising a material which is used for at least one of said electrodes and which is turned into the ultra-fine particles, a power source by which an arc current or/and an arc voltage is/are set at a predetermined value/predetermined values so as to generate plasma currents flowing from the end parts of the respective electrodes toward the intermediate parts of the arcs, and a material feeder which feeds the rod-shaped or wire-shaped material in accordance with the consumption thereof, whereby even when the material has consumed, the ultra-fine particles can be continuously produced without the necessity of shutting down the apparatus for the replenishment of the material.

DETAILED DESCRIPTION OF THE INVENTION

Now, embodiments of the present invention will be described.

Figure 1A:
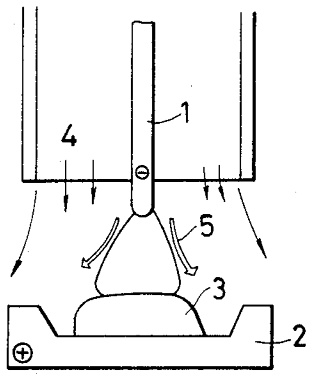
FIGS. 1(*a*) and 1(*b*) are views for explaining the aspects of striking arcs, in which FIG. 1(*a*) shows the arcing aspect based on a prior-art manufacturing method, while FIG. 1(*b*) shows the arcing aspect based on a manufacturing method according to the present invention.
Figure 1B:
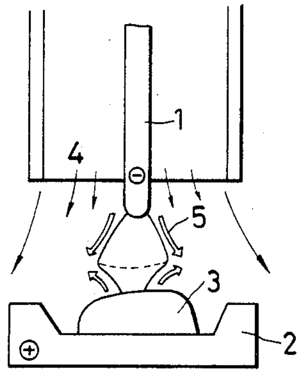
Figure 2A:
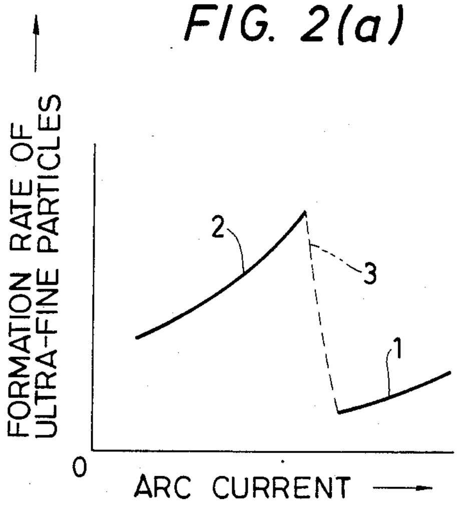
FIGS. 2(*a*) and 2(*b*) are diagrams for explaining the formation rates of ultra-fine particles by the prior-art manufacturing method and the manufacturing method of the present invention in relation to an arc current and an arc voltage, in which FIG. 2(*a*) concerns the arc current, while FIG. 2(*b*) concerns the arc voltage.
Figure 2B:
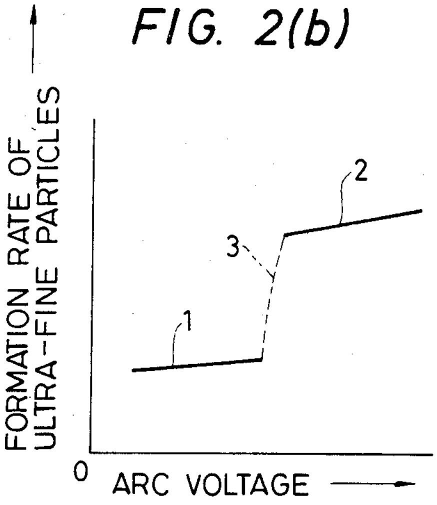

Methods of manufacturing metallic ultra-fine particles by utilizing arcs are illustrated in FIGS. 1(*a*) and 1(*b*). The arcs are struck by causing an ($Ar+50\%\ H_2$) gas 4 to flow across an electrode 1 and a material 3 which is located on a holder 2 and which is turned into the ultra-fine particles, and the electrode 1 and the material 3 are respectively held minus and plus in potential. Then, in an area of great arc current having hitherto been generally employed (hereinbelow, this area shall be called the "regular area"), the arcs assume a downwardly flaring arcing aspect spread fanwise as shown in FIG. 1(*a*). On the other hand, in an area whose arc current is smaller than in the regular area (hereinbelow, that area shall be called the "high rate area"), the arcs assume a rhombic aspect wider at the intermediate parts of the arcs as shown in FIG. 1(*b*), and the formation rate of the ultra-fine particles increases remarkably. The relationships between the arc currents and the formation rates of the ultra-fine particles in the regular area and the high rate area become as illustrated in FIG. 2(*a*), from which it is seen that the formation rate of the ultra-fine particles changes conspicuously with a transaction area 3 as a boundary. The phenomenon on this occasion proceeds as follows. When an anode spot has appeared on the surface of the material 3, metal vapor is generated owing to a high temperature, and since the ionization voltage is low, electric currents flow into this spot concentratively to promote the generation of the metal vapor. Further, since current densities are high in the cathode portion of the electrode 1 and the anode spot portion of the material 3, the pressures of these portions rise to become higher than the arc pressure of the middle part between the electrodes, and hence, gas currents arise from the vicinities of both the electrode parts toward the middle part. When the gas currents have arisen, plasma currents 5 arise from the surroundings in order to replenish the gas at both the electrode points. Accordingly, the metal vapor having appeared in the anode portion is transported by the plasma currents (anode flames) 5, and it is produced continuously.

When the current increases, the area of the anode spot enlarges, and the current density lowers, so that the anode flames decrease. On the other hand, since the current density of the cathode portion rises, cathode flames increase, so that the arcing aspect shown in FIG. 1(*a*) is established to lessen the formation rate of the metal vapor.

With materials of high heat conductivity such as Al and Cu and materials of high vaporizing temperature such as W and Ta, the appearance of the anode flames is weak, so that such change of the arcing aspects is difficult to take place.

As the arc current, a current value smaller than a current value $I_A$ is caused to flow, the current value $I_A$ being one at which the arcs begin to change from the flaring shape to the rhombic shape and which is indicated by:

$$I_A = aL + b$$

where;

L; the distance (mm) between the material and the electrode, a, b; values which vary depending principally upon the composition of the atmosphere gas, the composition of the material, the composition and the shape as well as the diameter of the electrode, the flow rate of a shield gas, the pressure of the atmosphere, etc., and which lie in the ranges of 30 A/mm≧a≧2 A/mm and 200 A/mm≧b≧0.

The area where the high rate arcs excellent for the manufacture of the ultra-fine particles are existent, vary depending upon the arc current value, the distance between the electrodes, the shape, diameter and composition of the electrode, the composition and pressure of the atmosphere gas, the kind of the material, the flow rate of the shield gas, etc.

The current value $I_A$ at which the regular arcs (the arcs in the regular area) begin to change to the high rate arcs (the arcs in the high rate area), vary due to the various factors as stated before. When the current value $I_A$ was measured while changing the inter-electrode distance, it has been revealed to be indicated by $I_A = aL + b$. a and b vary depending upon the aforementioned other factors, namely, the composition of the gas, the shape, composition and diameter of the electrode, the composition of the material, the pressure of the atmosphere, the flow rate of the shield gas, etc. From the results of extensive experiments concerning various materials, electrodes, gaseous compositions, pressures etc., it has been confirmed that a lies in the range of 2 A/mm–30 A/mm, while b lies in the range of 0–200 A/mm.

Figure 3:
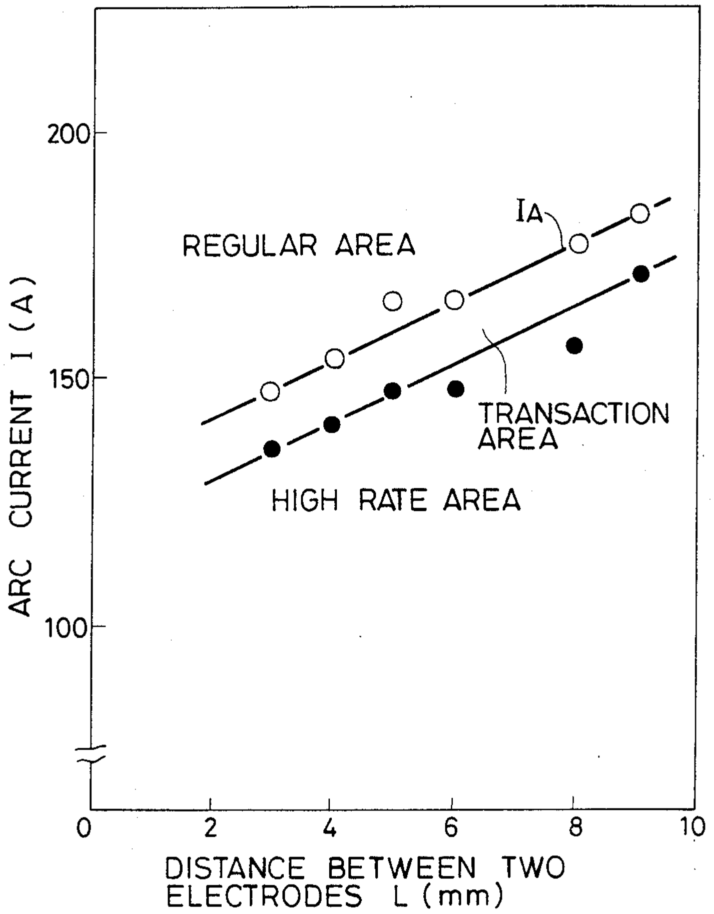
FIG. 3 is a diagram for explaining the relationship between an inter-electrode distance and an arc current.

Results obtained by measuring the current value $I_A$ as to a case where the material was nickel are shown in FIG. 3.

FIG. 3 indicates the relationship among the arc current, the inter-electrode distance and the arc shape in the case where the atmosphere gas was Ar—50% $H_2$ and had a pressure of 1 atm., where the cathode was a tungsten electrode (having a diameter of 3.2 mm and containing 2% of thoria) and where the flow rate of the shield gas was 15 lit./min.

Of two straight lines depicted in FIG. 3, the straight line 1 (on a higher current side) denotes the current values $I_A$ at which the regular arcs begin to change to the high rate arcs. The straight line 2 (on a lower current side) denotes current values which indicate the end of the change from the regular arcs to the high rate arcs. Areas divided by the two straight lines 1 and 2 are the regular area, the transaction area and the high rate area as viewed from the higher current side, respectively.

In general, when the concentration of hydrogen is lowered, the transaction and high rate areas shift toward the lower current side, and consequently the formation rate of ultra-fine particles lowers.

Contrariwise, when the hydrogen concentration is raised, the areas shift toward the higher current side, and the formation rate of ultra-fine particles increases.

When the regular area and the high rate area are compared in point of the formation rate of ultra-fine particles, the latter is much higher. The reason is that, since the arcs in the high rate area (the high rate arcs) concentrate locally on the material, the material can be vaporized efficiently. In the regular area, most of the material (about 40 gr. of nickel) is melted, whereas in the high rate area, only the part of the concentrating arcs is melted. Therefore, the quantity of heat other than that used for the vaporization of the metal is small, and the efficiency becomes high. The concrete numerical values of the formation rates of ultra-fine particles in the regular area and the high rate area are mentioned in FIG. 4.

Figure 4:
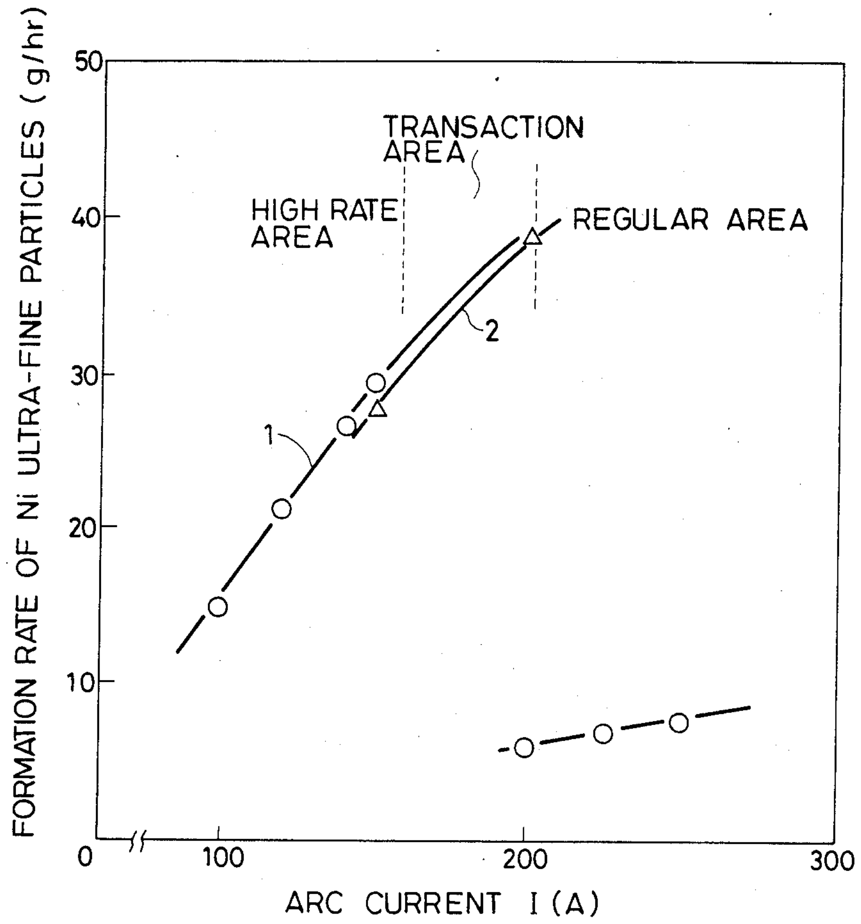
FIG. 4 is a diagram for explaining the relationship between an arc current and the formation rate of ultra-fine particles in the case of nickel.

FIG. 4 illustrates the formation rates of ultra-fine nickel particles in the case where the material was nickel, the atmosphere was Ar—50% $H_2$ under a pressure of 1 atm., the inter-electrode distance was L=10 to 12 mm and the flow rate of the shield gas was 15 lit./min. Curve 1 corresponds to the cathode which was a tungsten electrode (containing 2% of thoria) 3.2 mm in diameter, and curve 2 the cathode which was a tungsten electrode (containing 2% of thoria) 6.4 mm in diameter.

When the diameter or shape of the electrode is changed, the high rate area shifts, and it comes to exhibit about 6 times (about 40 gr./hr.) the formation rate in the regular area as seen from FIG. 4. This phenomenon in which the high rate area shifts toward the higher current side in accordance with the changes of the diameter or shape of the electrode and the composition of the atmosphere gas, to form the ultra-fine particles more efficiently, has also been verified as to other metals.

The high rate arcs are not limited to the case of employing nickel as the material, but they are similarly struck with other substances including various metals and alloys such as iron, titanium, chromium, cobalt, ferroalloys, nickel alloys and titanium alloys.

The above-stated formation rates of ultra-fine metal particles not greater than a particle size of 1 μm are collectively listed in Table 1 in comparison with those in the regular area.

TABLE 1

| Element | Formation Rate in Regular Area | Formation Rate in High Rate Area |
|---|---|---|
| nickel | 7 gr./hr. | 40 gr./hr. |
| iron | 7 gr./hr. | 48 gr./hr. |
| titanium | 0.6 gr./hr. | 21 gr./hr. |

Moreover, electric power required for the manufacture of ultra-fine particles is much less in the high rate area than in the regular area. Listed in Table 2 are formation efficiencies which are obtained in such a way that the formation rates of ultra-fine particles in the regular area and the high rate area mentioned in Table 1 are divided by input power.

TABLE 2

| Element | Formation Rate in Regular Area | Formation Rate in High Rate Area |
|---|---|---|
| nickel | 0.9 gr./hr.-kW | 5.4 gr./hr.-kW |
| iron | 0.9 gr./hr.-kW | 8.0 gr./hr.-kW |
| titanium | 0.4 gr./hr.-kW | 3.2 gr./hr.-kW |

Although the foregoing has referred to the relationship between the arc current and the formation rate of ultra-fine particles, this formation rate is also affected by an arc voltage (arc length) as illustrated in FIG. 2(*b*), and hence, the arc voltage needs to be set at a proper value (approximately 15–90 V). Further, the ultra-fine particles can be efficiently formed by controlling both the arc current and the arc voltage to the proper values.

As regards the atmosphere gas in the case of striking arcs, the ultra-fine particles can be efficiently formed when a gas is used in which hydrogen ($H_2$) gas, water vapor or the like having a great thermal pinch force is mixed in argon (Ar) gas striking the arcs readily, namely, having a low potential gradient or when a sufficient potential is obtained from a power source and the hydrogen gas, the water vapor or the like of great thermal pinch force is used.

Figure 5:
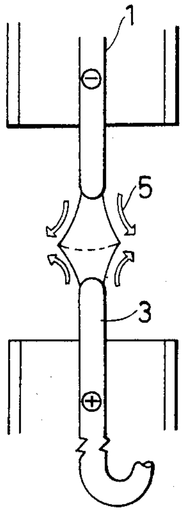
FIG. 5 is a view for explaining an embodiment of the manufacturing method of the present invention.

In order to actively generate the metal vapor, the material 3 of the paired electrode is put into small geometries so as to promote the generation of the metal vapor owing to a temperature rise, or it may be put into a wire shape as shown in FIG. 5 for the same reason. In the case of the wire shape, the rate of consumption is great, and hence, a mechanism for continuously supplying the material and a mechanism for controlling the arc length to be constant are disposed.

Figure 6:
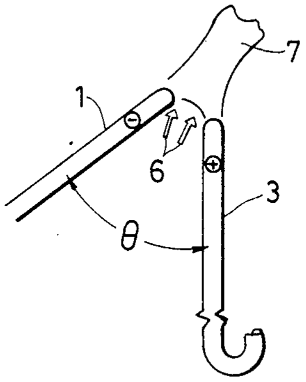
FIG. 6 is a view for explaining another embodiment of the manufacturing method of the present invention.
Figure 7:
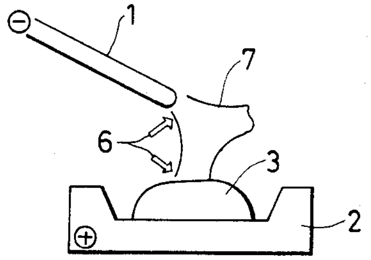
FIG. 7 is a view for explaining still another embodiment of the manufacturing method of the present invention.

Next, when the electrodes are arranged so as to define an angle of $\theta=0°$ to 170° as shown in FIG. 6 or FIG. 7, the region in which the arcing aspect changes due to the increase of the arc current becomes difficult to arise. More specifically, an electromagnetic force based on a conduction current causes the arcs across the electrodes to repel (arrows 6) and generates anode flames and cathode flames as indicated by an arrow 7, and a metal vapor stream is transported by the flames. Accordingly, even when a current greater than in the foregoing case of FIG. 1 is caused to flow, the quantity of generation of the metal vapor increases with the increase of the conduction current because the plasma currents of both the electrodes do not oppose, and the metal vapor is produced while being transported by the plasma currents.

Figure 8:
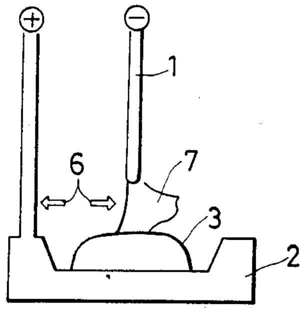
FIG. 8 is a view for explaining yet another embodiment of the manufacturing method of the present invention.

Further, as illustrated in FIG. 8, when the electric conduction path of the holder 2 for the material 3 is rendered parallel to the electrode 1, an electromagnetic force based on a conduction current curves the arcs outwards (arrows 6) and generates anode flames and cathode flames as indicated by the arcs 7. For this reason, the metal vapor is produced while being transported by the currents. As a result, the increase of the formation rate of ultra-fine particles based on the increase of the electric current is permitted for the reason explained in the foregoing case of FIG. 6 or FIG. 7.

Figure 9:
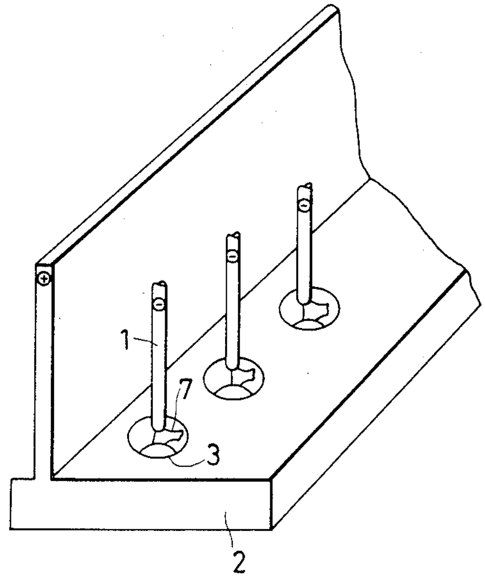
FIG. 9 is a view for explaining a further embodiment of the manufacturing method of the present invention.

In order to more increase the formation rate, as illustrated in FIG. 9, a plurality of electrodes 1 are arranged with one side of the electrodes 1 held at a common potential, and an electric conduction path is established so that the flames of both the poles may appear as the arcs 7 as shown in the foregoing case of FIG. 8. Thus, the increase of the formation rate proportional to the number of electrodes is achieved.

Figure 10:
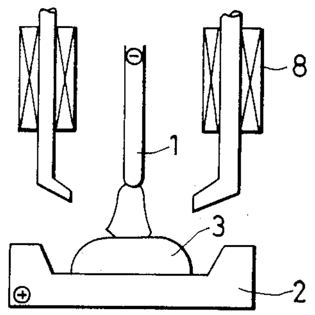
FIG. 10 is a view for explaining a still further embodiment of the manufacturing method of the present invention.

In addition, the direction in which the flames of both the poles appear as shown in the foregoing case of FIG. 8 is realized in such a way that, as illustrated in FIG. 10, a permanent magnet or electromagnet 8 is disposed near the arcs so as to control them.

In a case where a material of high melting point such as W or Ta is employed as the electrode material, more ultra-fine particles of the material of lower vaporization point are formed. Besides, when the same kind of material is used for both the electrodes, ultra-fine particles of higher purity are obtained. Moreover, ultra-fine particles in which two or more kinds of metals are mixed or alloyed can be obtained by employing an alloy electrode or making the materials of both the electrodes different. While the rate of vaporization changes depending upon polarities, ultra-fine particles can be formed by setting the opposite polarity to the foregoing polarity in case of direct current or by employing alternating current. In the case of employing alternating current, ultra-fine particles can be efficiently produced by properly selecting such conditions as the frequency of the alternating current, a feed voltage, and high voltage application for re-ignition, though they differ depending upon the electrode material and the atmosphere gas.

Regarding the sizes of ultra-fine particles, when the particles are manufactured by the methods of FIGS. 1(*b*) and 5, the metal vapor is reheated by the arcs and grows to be great, so that the particle sizes somewhat deviate. With the methods of FIGS. 6–10, however, the period of time during which the metal vapor is reheated becomes shorter, and the deviation of the particle sizes lessens.

Figure 11:
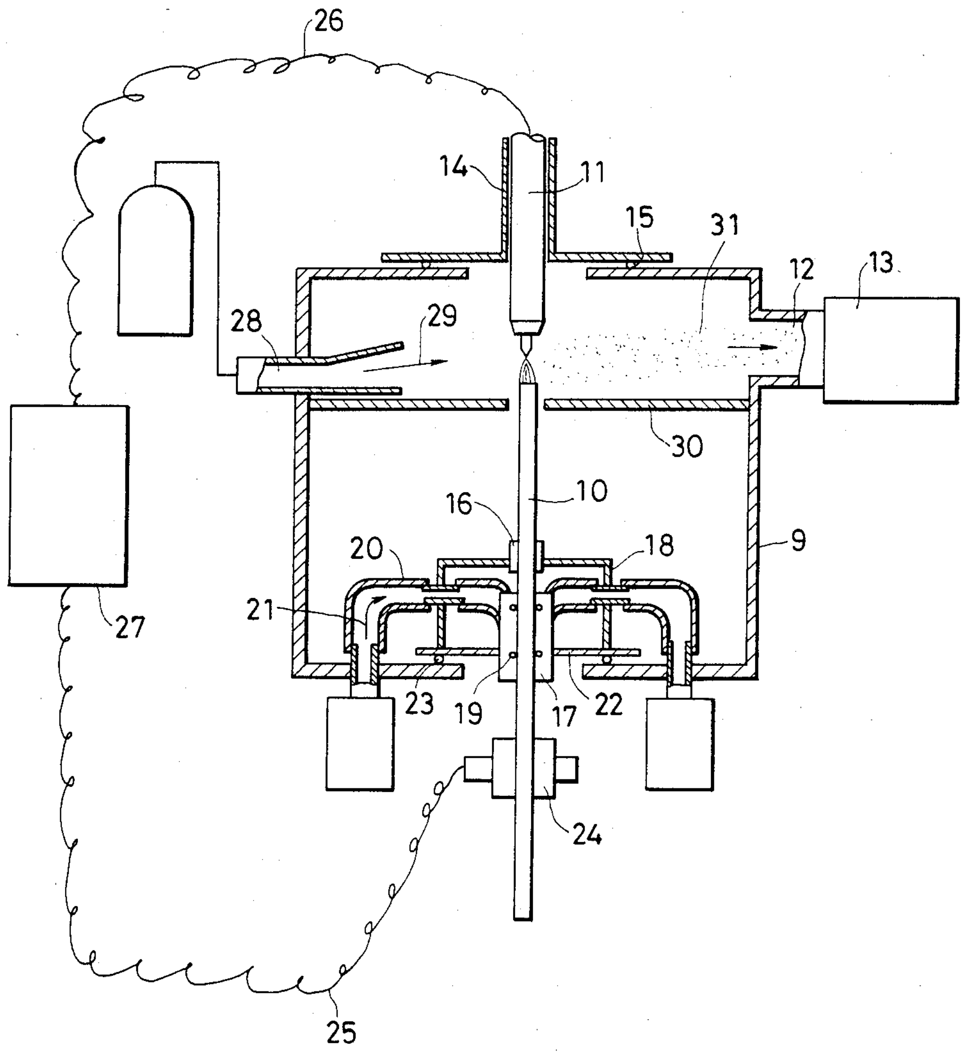
FIG. 11 is a vertical sectional view of an embodiment of a manufacturing apparatus according to the present invention.

FIG. 11 is a vertical sectional view of an embodiment of an ultra-fine particle manufacturing apparatus according to the present invention. The embodiment is an example in which one electrode and a material to turn into ultra-fine particles and serving as the other electrode are arranged in opposition.

In the chamber 9 of the ultra-fine particle manufacturing apparatus, a material 10 for ultra-fine particles and an electrode (here, a TIG torch is used) 11 being a heating source are opposingly arranged. A passage 12 functions both as a passage for conveying the formed ultra-fine particles to a collecting compartment 13 and as a passage for communication with an evacuating system (not shown). The electrode 11 is fixed by a cover 14, and is shut off from the outside air by an O-ring 15. The rod-like material 10 is held by a bearing portion 16, and is further held in a cooling/sealing portion 17. The bearing portion 16 is fixed by a base 18. The cooling-/sealing portion 17 includes an O-ring 19, with which the rod-like material 10 and the outside air are cut off. The cooling/sealing portion 17 is cooled by cooling water 21 which passes through a cooling water pipe 20 (fabricated of a nonconductive material). An insulating plate 22 is installed for the fixation of the cooling/sealing portion 17 and simultaneously for the electrical insulation between the rod-like material 10 and the chamber 9. An O-ring 23 is intended to seal the insulating plate 22 and the chamber 9. A feeder 24 is installed in order to raise the material 10 at a speed corresponding to the rate at which the fore end of the material 10 decreases according to the formation of the ultra-fine particles, and it is driven indirectly by a driver (not shown). The feeder 24 is connected to a lead 25, which is connected along with a lead 26 to a power source 27 for setting an arc current and an arc voltage at predetermined values. A carrier gas passage 28 serves to introduce a carrier gas 29. A shield plate 30 serves to efficiently guide the formed ultra-fine particles 31 to the collecting compartment 13 by means of the carrier gas 29.

Next, the operation of the present embodiment will be described. In the state installed as shown in FIG. 11, the chamber is evacuated from the passage 12, and the partial pressure of oxygen is usually lowered down to approximately $1\times10^{-3}$ Torr in order to prevent the formed ultra-fine particles 31 from oxidizing. Subsequently, the carrier gas 29 to be used is enclosed into the chamber 9 through the passage 28. Then, the electrode 11 is energized to strike arcs between it and the material 10. In the present embodiment, the TIG torch is used, and a gas consisting of 50% of hydrogen and the balance of argon is used as the enclosed gas. The material 10 employed is a nickel rod having a diameter of 5.0 mm, and a current of 35 V×140 A is caused to flow across the electrode 11 and the material 10. The arcs struck across the electrode 11 and the material 10 are fined by the hydrogen gas contained in the atmosphere gas, to concentrate on the surface of the material 10. This surface is also given the dissociation energy of hydrogen and is rapidly raised in temperature, to emit the vapor of nickel. The arcs are further concentrated owing to the generation of the nickel vapor, and much of supplied energy is consumed for the vaporization of nickel and the formation of the ultra-fine particles 31. The ultra-fine particles 31 produced are carried to the collecting compartment 13 through the passage 12 by the carrier gas 29. The material 10 whose length decreases on account of the formation of the ultra-fine particles 31 is raised at the fixed speed (in the present embodiment, 4 mm per minute) by the feeder 24 in order to hold arc lengths constant and to continuously form the ultra-fine particles 31 under favorable conditions.

As a result, the ultra-fine particles at about 40 gr./hr. can be obtained.

Figure 12:
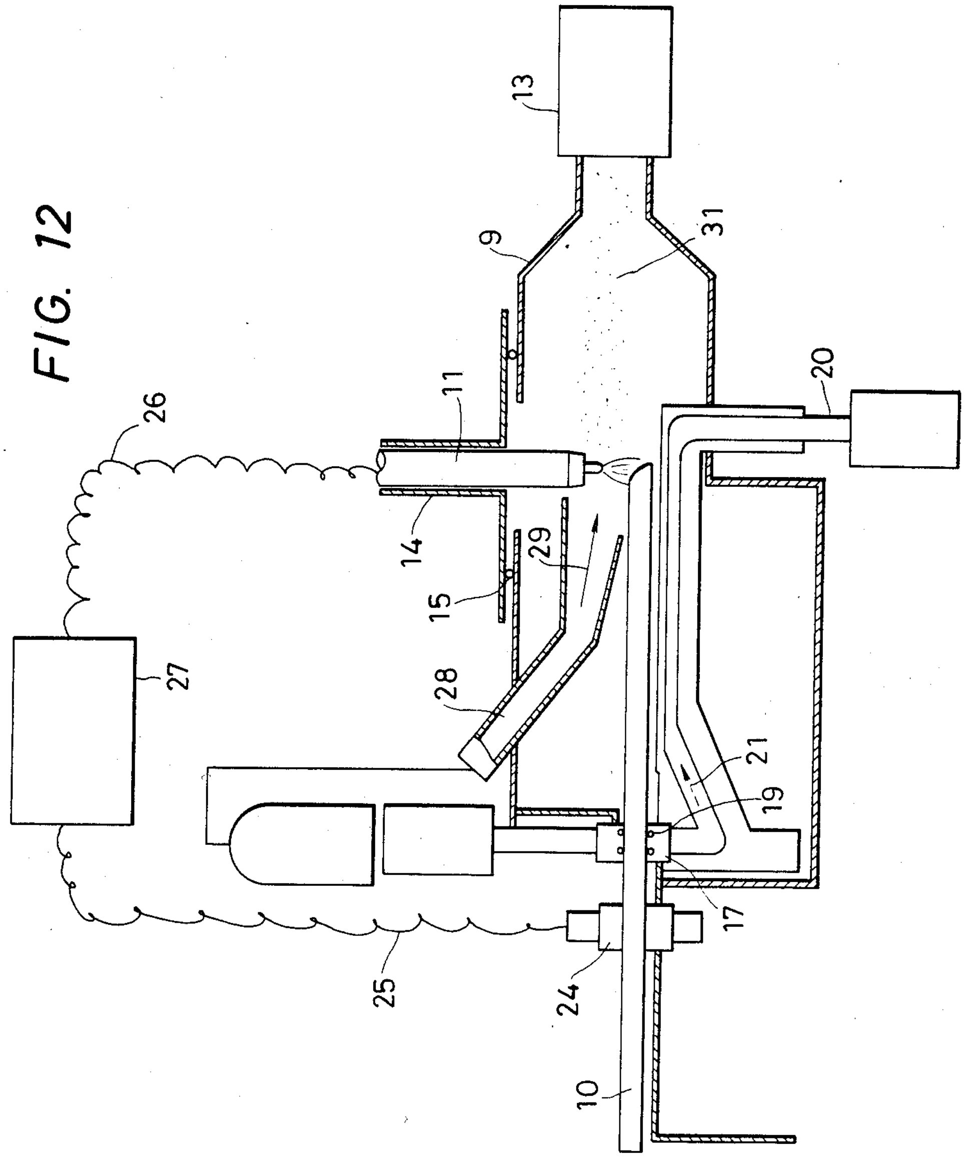
FIG. 12 is a vertical sectional view of another embodiment of the manufacturing apparatus of the present invention.

FIG. 12 shows an example in which an electrode 11 and a rod-like material 10 are located substantially orthogonally. The names and functions of various portions are substantially the same as in FIG. 11. In the present embodiment, the cooling/sealing portion 17 is fabricated of ceramics and serves also for electrical insulation. In addition, the cooling water 21 is passed through a tube made of teflon 20 for insulation.

While, in the above, the rod-shaped material has been referred to, similar effects are attained even when a wire-shaped material is used in accordance with the kind of ultra-fine particles to be formed. The wire-shaped material may well be disposed in the form of a coil within the chamber.

In the foregoing embodiments, the continuous manufacture of the ultra-fine particles consumes and shortens the rod-like material, but it can be continued when the material is fed from the side opposite to the electrode.

It will now be elucidated that the thermal efficiency is enhanced in the present invention.

In case of using a water-cooled hearth as in the prior-art method, the rate of heat to be dissipated by cooling water is evaluated from the temperature difference of the inlet and outlet of the cooling water and the rate of the cooling water. When 50 gr. of nickel is formed into ultra-fine particles at an arc power of 6 kW by the prior-art method, the cooling water at 0.2 $m^3$/hr. is used, and the temperature difference of the inlet and outlet of the cooling water is 2.0° C. Accordingly, the rate of heat dissipated by the cooling water becomes:

$$0.2\times1000\times2=400 \text{ kcal/hr.}$$

On the other hand, in case of using the nickel rod 5 mm in diameter (1 m long) as shown in FIG. 9, the rate of heat to be dissipated is indicated by Eq. (1) mentioned below. Here, assuming:

heating surface temperature $\theta_o$: melting point 1730° C. of nickel.

ambient temperature $\theta_f$: 50° C., $\lambda$(thermal conductivity): 77 kcal/mh °C., $\alpha$(coefficient of heat transfer from nickel to surroundings): 10 kcal/mh °C., S: cross-sectional area of nickel rod, and P: peripheral length of nickel rod, then the temperature $\theta$ of the point at the length of 1 m has the relation:

$$\frac{\theta-\theta_f}{\theta_o-\theta_f} = e^{-mx} \text{ where } m = \left(\frac{\alpha\cdot P}{\lambda S}\right)^{\frac{1}{2}} \quad (1)$$

Next, the total quantity of heat $Q_o$ to pass through the section of the end face has the relation:

$$Q_o = \lambda S m(\theta_o-\theta_f) = \sqrt{\alpha P\lambda S(\theta_o-\theta_f)} \quad (2)$$

From Eq. (1), accordingly, $$S = \frac{\pi}{4} \times 0.005^2 = 1.96 \times 10^{-5} m^2$$

$$P = \pi \times 0.005 = 1.57 \times 10^{-2} m$$

$$m = \sqrt{\frac{\alpha \cdot P}{\lambda \cdot S}} = \sqrt{\frac{10 \times 1.57 \times 10^{-2}}{77 \times 1.96 \times 10^{-5}}} = 10.2$$

$$\begin{aligned}\theta &= \theta_f + (\theta_o - \theta_f)e^{-m} \\ &= 50 + (1730 - 50)e^{-10.2} = 50^\circ \text{ C.}\end{aligned}$$

Thus, the total quantity of heat $Q_o$ to pass through the section of the end face becomes:

$$\begin{aligned}Q_o &= Sm(\theta_1 - \theta_f) \\ &= 77 \times 1.96 \times 10^{-5} \times 10.2 \times (1730 - 50) \\ &= 25.8 \text{ kcal/hr}\end{aligned}$$

As described above, the present embodiment does not use the water-cooled hearth or the like, and it is therefore obvious that the thermal efficiency is sharply enhanced. While the cooling/sealing portion 17 is cooled by the cooling water 21 in the present embodiment, the rate of heat which is dissipated by this cooling is much lower than the rate of heat which is dissipated by a water-cooled crucible in the prior art.

Figure 13:
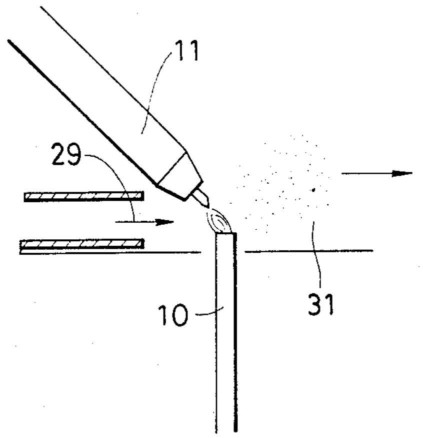
FIG. 13 is a partial enlarged view of still another embodiment of the manufacturing apparatus of the present invention.
Figure 14:
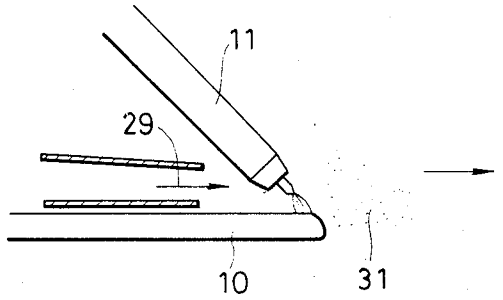
FIG. 14 is a partial enlarged view of yet another embodiment of the manufacturing apparatus of the present invention.

FIG. 13 is a partial view of an embodiment in which an electrode 11 is arranged in opposition to a rod-like material 10 aslant thereto ($\theta = 135°$), while FIG. 14 is a partial view of an embodiment in which an electrode 11 is similarly arranged in opposition to a rod-like material 10 aslant thereto. The period of time during which ultra-fine particles 31 formed lie in contact with arcs becomes shorter in the embodiment of FIG. 13 than in that of FIG. 9, and in the embodiment of FIG. 14 than in that of FIG. 12. Therefore, the embodiments of FIGS. 13 and 14 can produce uniform ultra-fine particles by avoiding the phenomenon in which the ultra-fine particles nearby combine into an increased particle size.

We claim:

1. In a method wherein ultra-fine particles are manufactured by employing for at least one of the electrodes a material to vaporize into the ultra-fine particles and striking arcs across one pair of electrodes, the steps of setting at least either of an arc current or of an arc voltage at a value to generate plasma currents from end parts of said electrodes toward intermediate parts of the arcs, and causing said arc current to flow with a current value which is smaller than a current value $T_A$ which equals aL+b, where L is a distance between the material and opposite electrode, 30 A/mm$\geqq$a$\geqq$2 A/mm, and 200 A/mm$\geqq$b$\geqq$0.

2. A method of manufacturing ultra-fine particles as defined in claim 1, wherein both the electrodes are arranged so that an electromagnetic force based on said arc current across said electrodes may repel the arcs one another and may generate vaporization flames of said material to turn into the ultra-fine particles, in a magnetic blowing direction.

3. A method of manufacturing ultra-fine particles as defined in either of claims 1 or 2, wherein said material to turn into the ultra-fine particles is formed in the shape of either of a rod and a wire.

4. A method of manufacturing ultra-fine particles as defined in claim 3, wherein said material is continuously fed in accordance with a rate of consumption thereof.

5. A method of manufacturing ultra-fine particles as defined in claim 1, wherein said material to turn into the ultra-fine particles is used for both the electrodes.

6. A method of manufacturing ultra-fine particles as defined in claim 1, wherein a magnet is arranged near the arcs so that vapor flames of said material may be generated in a magnetic blowing direction.

* * * * *